Nov. 7, 1933.  R. C. ANGELL ET AL  1,934,026
MANUFACTURE OF FLEXIBLE SHAFTING
Filed Aug. 1, 1931  9 Sheets-Sheet 1
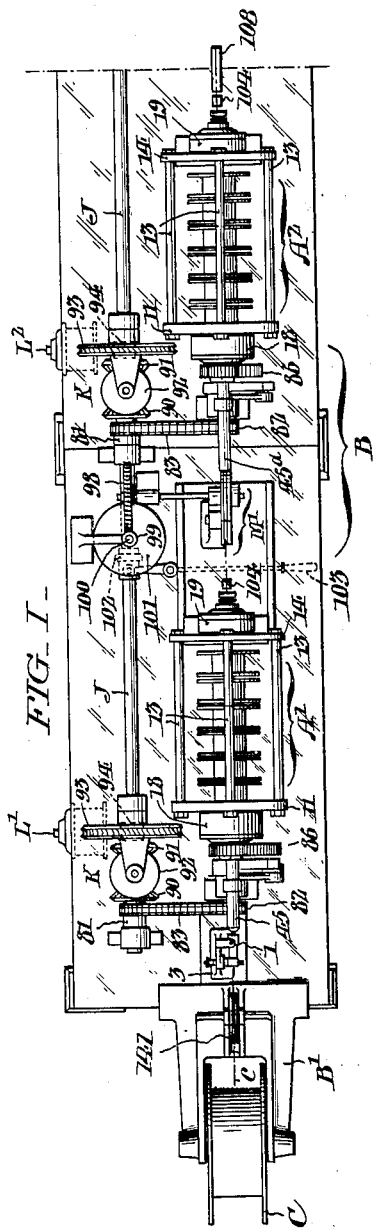
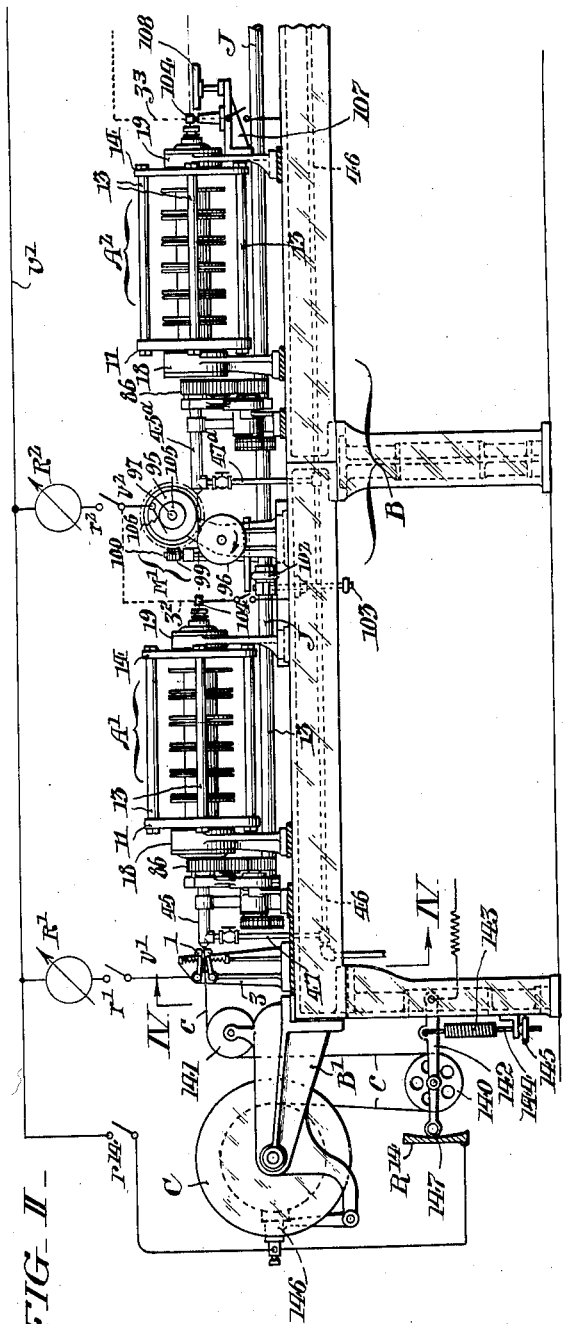
INVENTORS:
Robert C. Angell &
Frank L. O. Wadsworth,
ATTORNEYS.

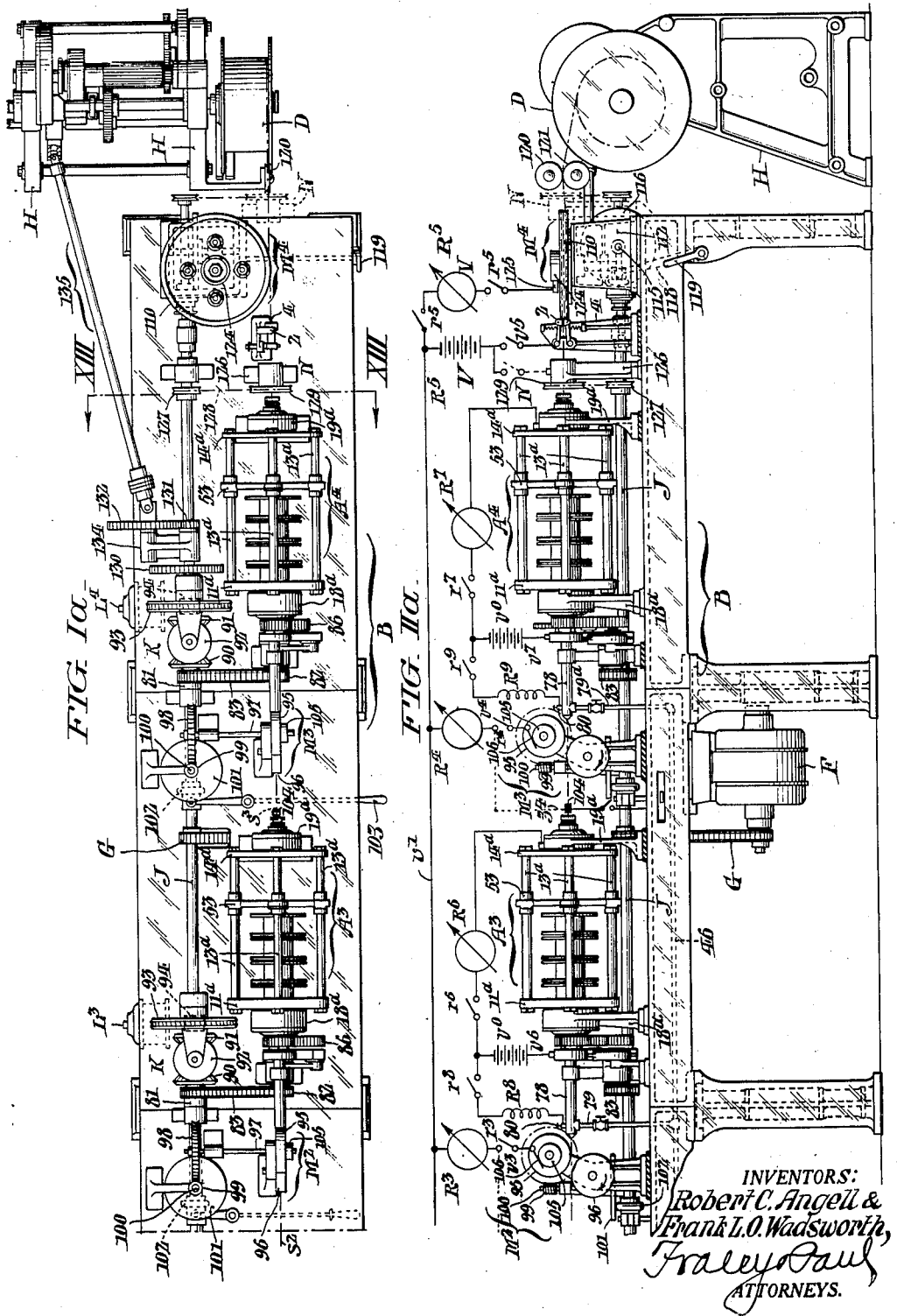

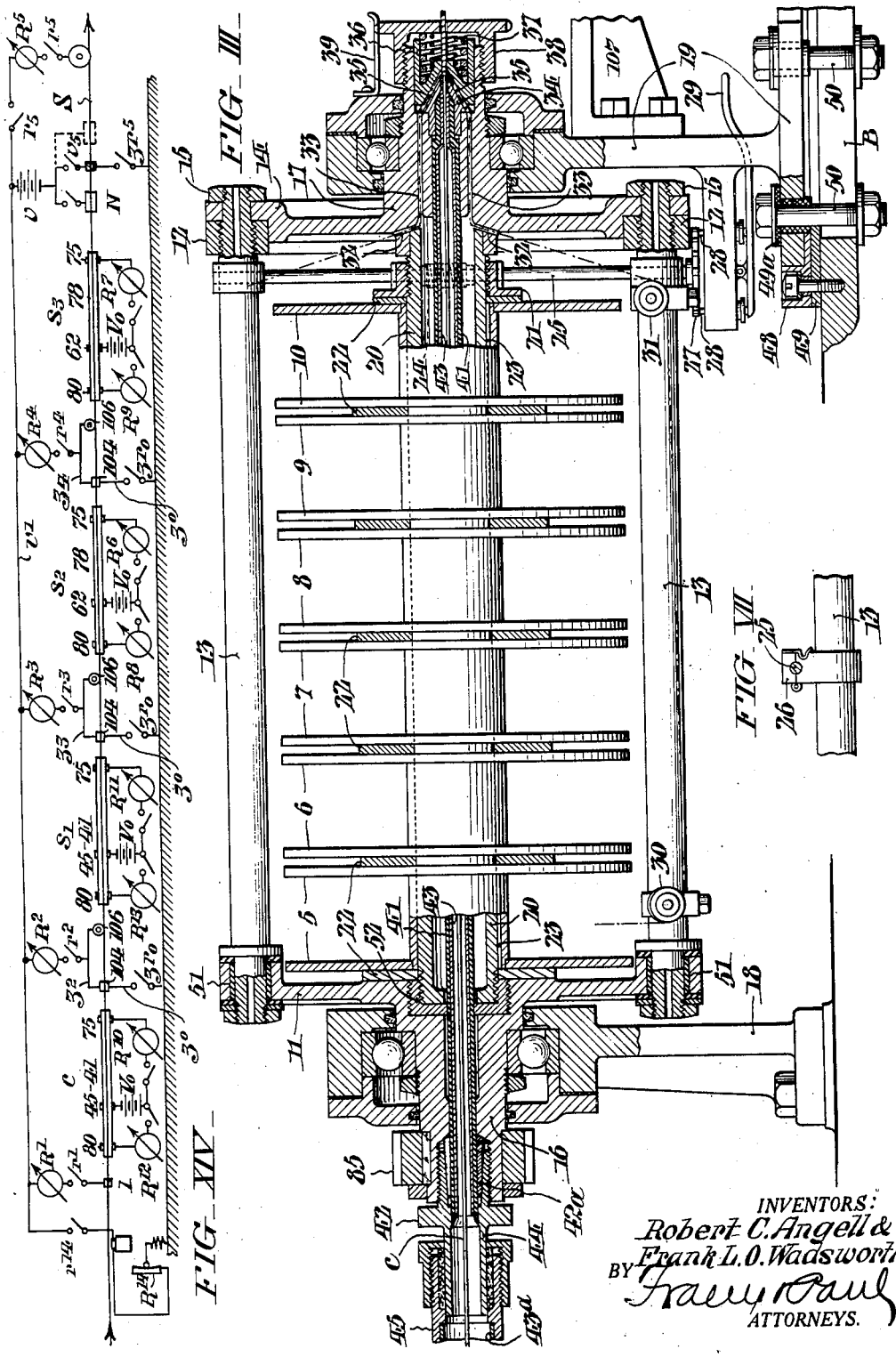

Nov. 7, 1933.  R. C. ANGELL ET AL  1,934,026
MANUFACTURE OF FLEXIBLE SHAFTING
Filed Aug. 1, 1931  9 Sheets-Sheet 4
*FIG. IV.*
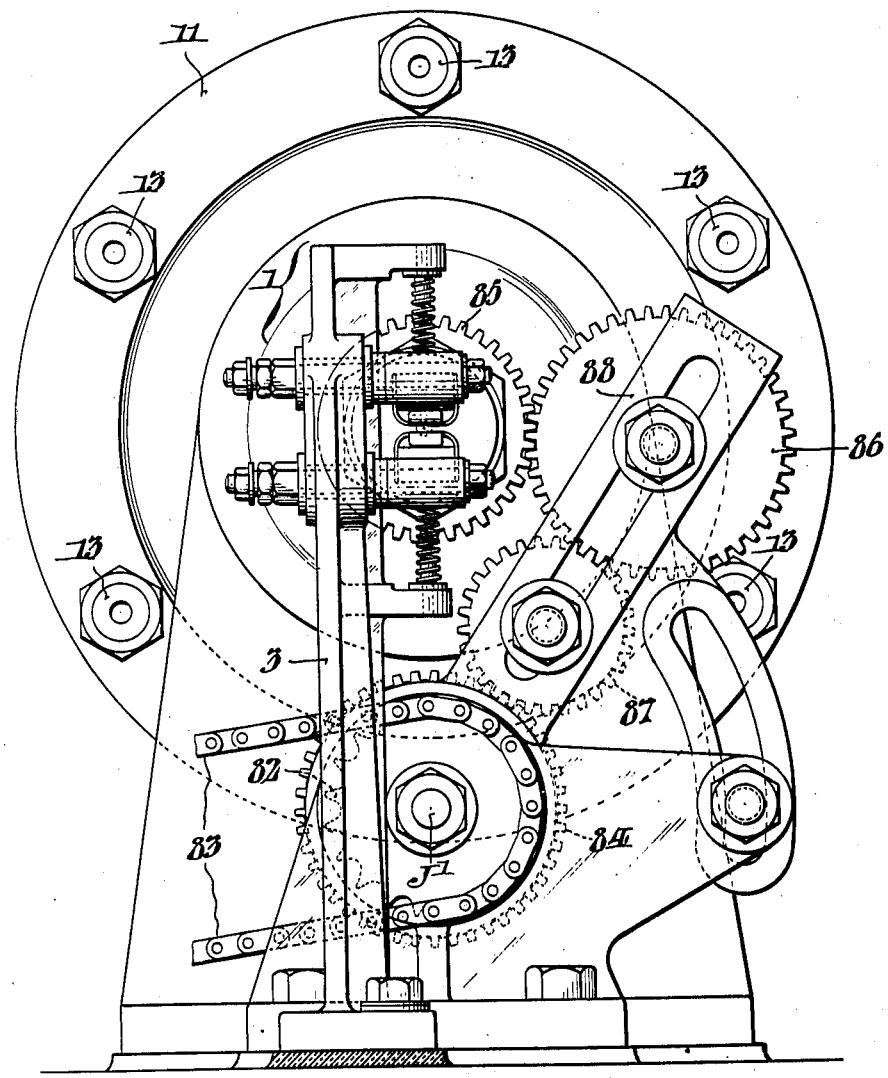
*FIG. XVII.*
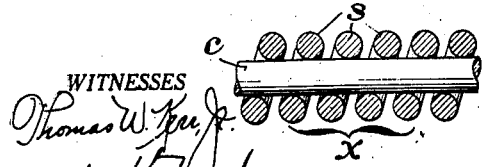
*FIG. XVIII.*

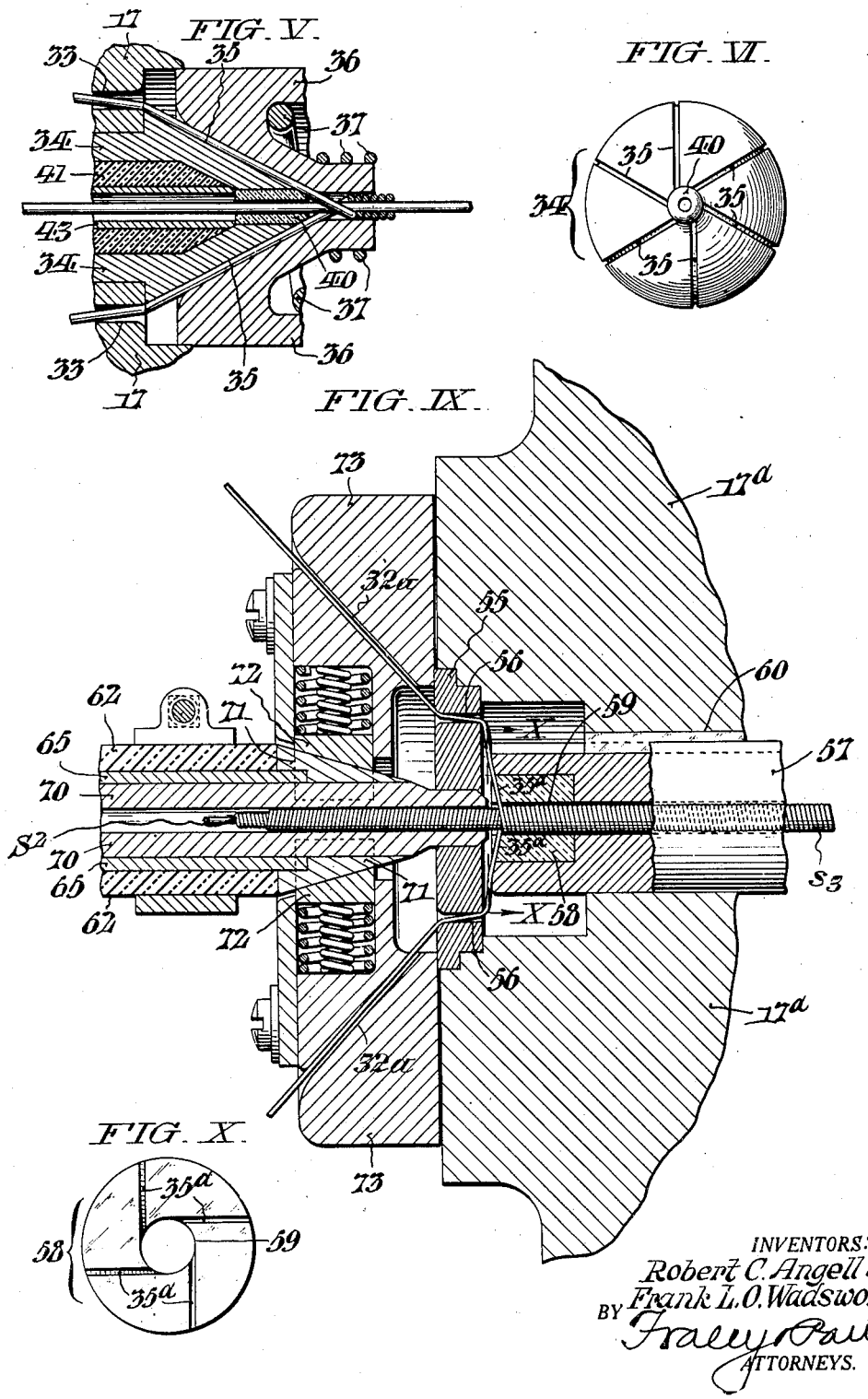

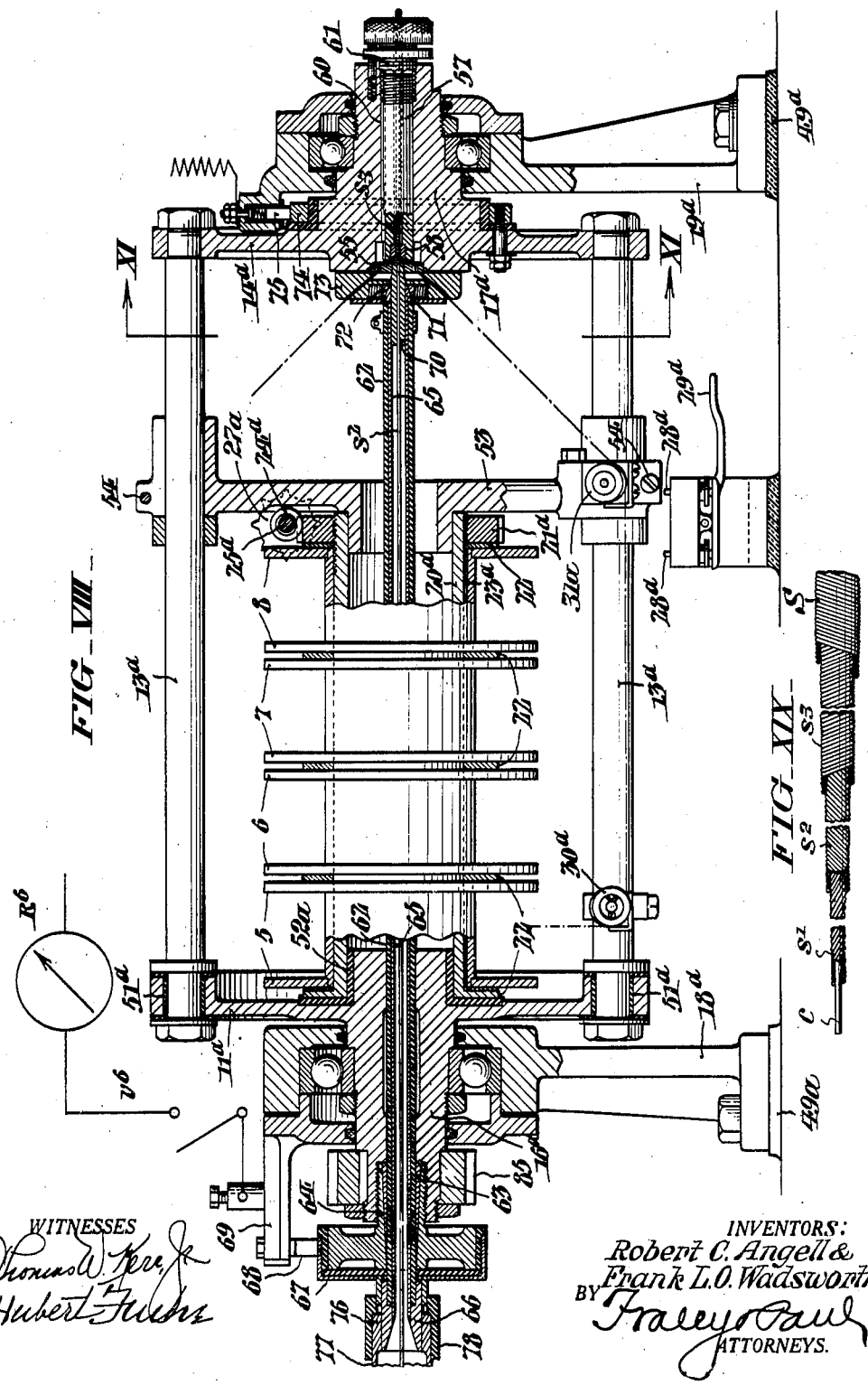

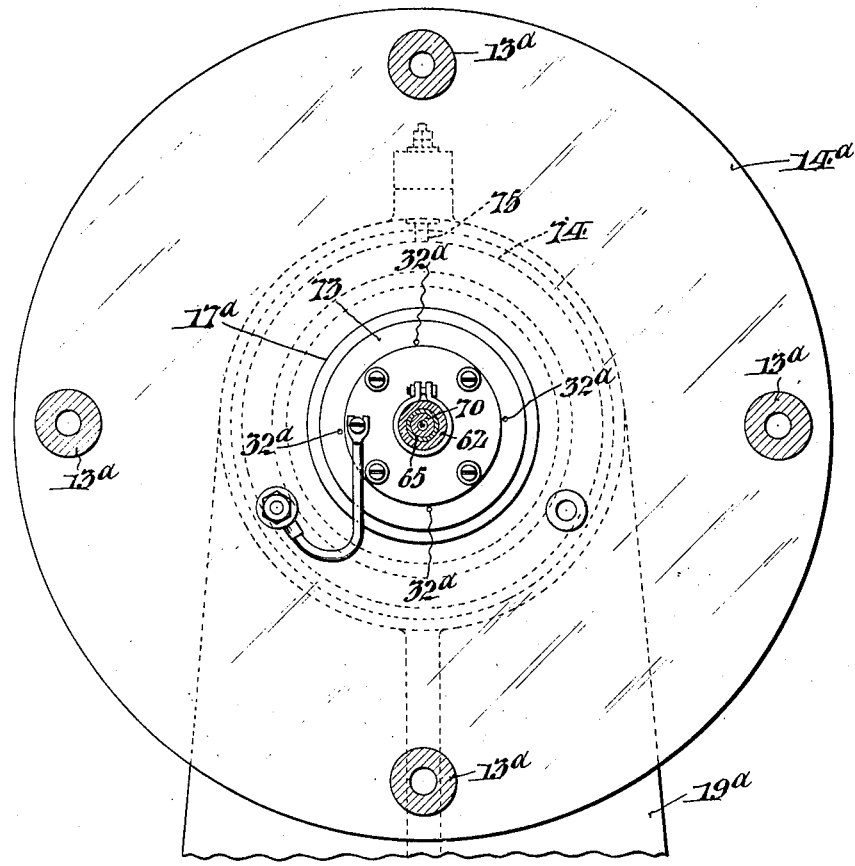
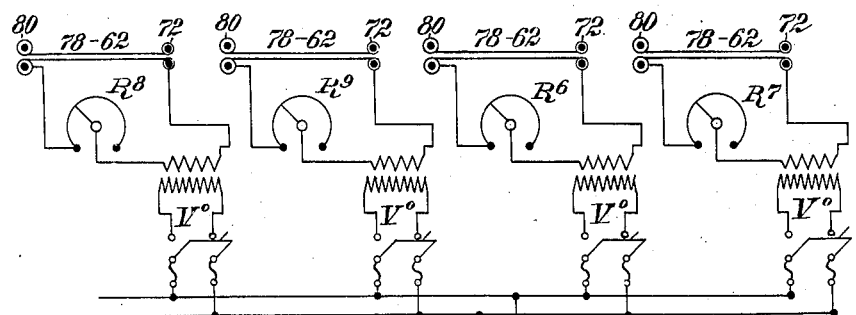

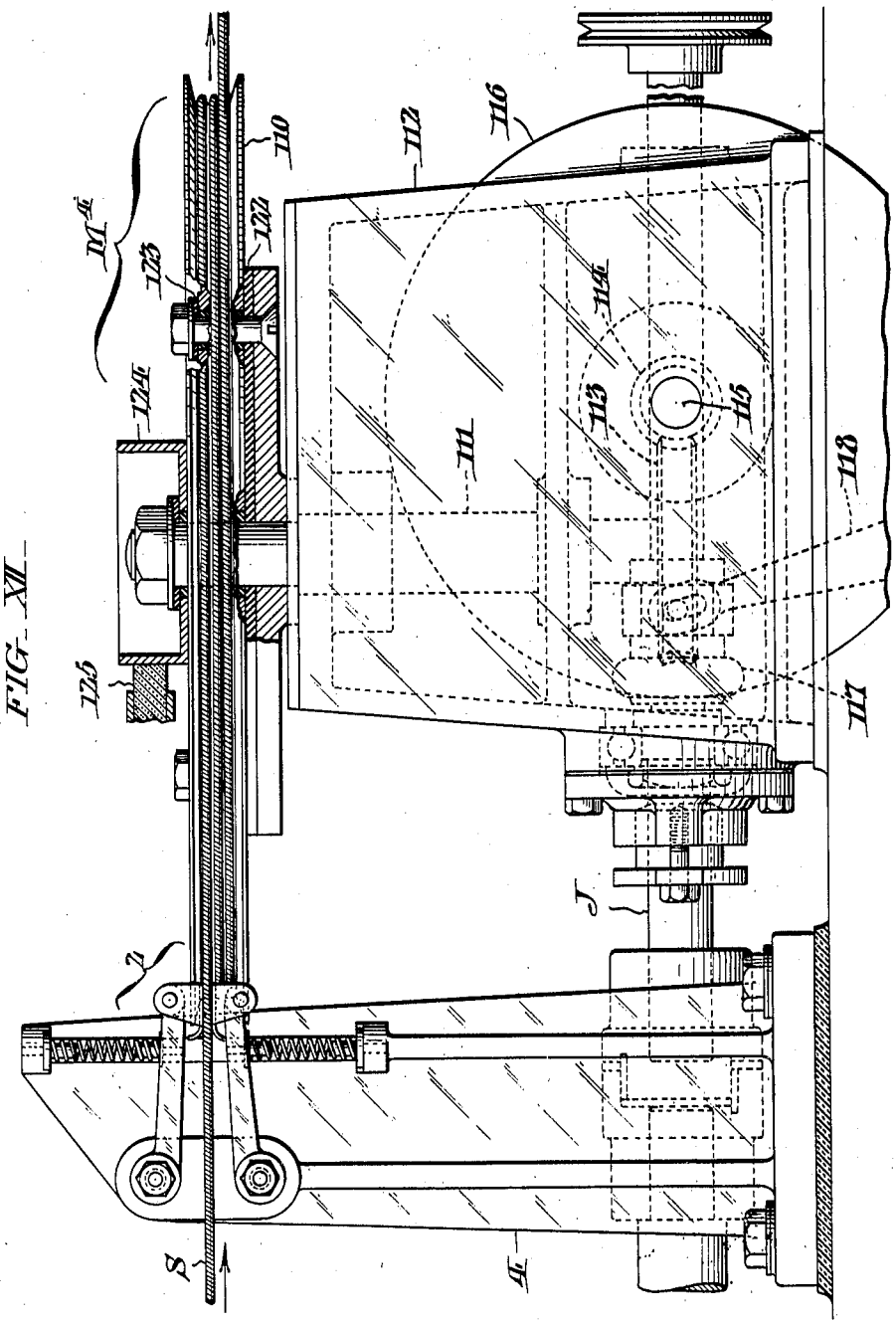

Nov. 7, 1933.                R. C. ANGELL ET AL                1,934,026
                      MANUFACTURE OF FLEXIBLE SHAFTING
                      Filed Aug. 1, 1931         9 Sheets-Sheet 9
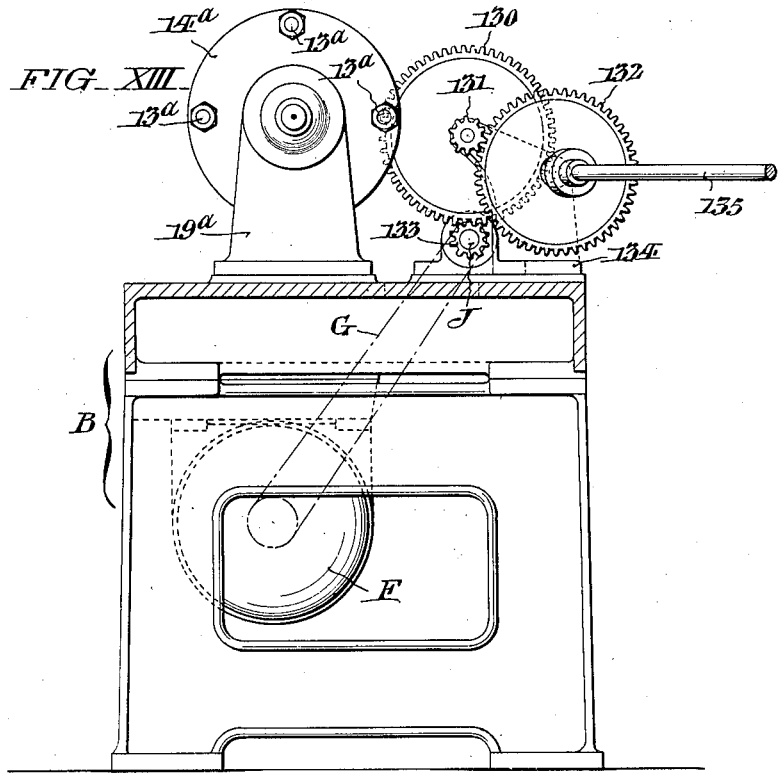
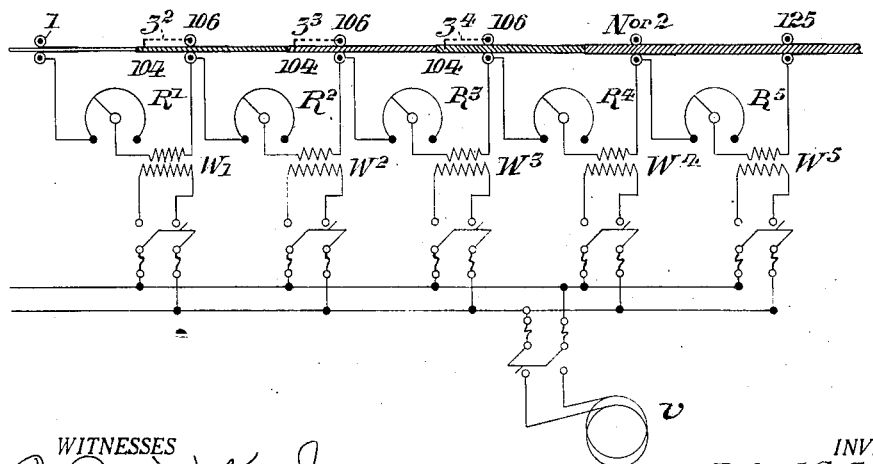
WITNESSES
INVENTORS:
Robert C. Angell &
Frank L. O. Wadsworth,
BY
ATTORNEYS.

Patented Nov. 7, 1933

1,934,026

UNITED STATES PATENT OFFICE 1,934,026

MANUFACTURE OF FLEXIBLE SHAFTING

Robert C. Angell, Prince Bay, N. Y., and Frank L. O. Wadsworth, Pittsburgh, Pa., assignors to The S. S. White Dental Manufacturing Company, a corporation of Pennsylvania Application August 1, 1931. Serial No. 554,584

18 Claims. (Cl. 117—20)

Our invention relates to a method and an apparatus for the manufacture of continuous lengths of flexible shafting that is fabricated, in one uninterrupted operation, by winding one or more successively superimposed layers of strand wire about a central core body; the general object of this invention being to produce, by this procedure, a finished shaft whose successively superposed elements will be freed, as completely as possible, from the initial stresses and strains imposed upon them during the winding operations and also freed from any detrimental pressure engagement with each other; and which can therefore be effectively used, in a bent or curved condition, as a power transmitting member, without the development of an objectionable amount of internal friction and a resultant loss of efficiency.

We have found that in the manufacture of continuous lengths of flexible shafting the heating during fabrication of the elements of which the shafting is composed is advantageous in order to avoid or reduce the otherwise troublesome initial stresses and strains imposed upon these elements by the fabrication operations. We accomplish this general object by heating each successive underlying or core element of the shaft to a relatively high temperature, before and during the winding of the next overlying layer of strand wire thereon; and thus progressively subjecting each of the several successively formed portions of the shaft, (i. e. the core body and one or more of the superimposed layers of strand wire), to an individual heat treatment during the sequential performance of each successive step of our procedure; whereby any irregular or intermittent strains that may be initially present in any of the wire elements, before they become a part of the shafting body, as well as any subsequent elastic distortions and stresses which may be imposed on the said elements while any one layer is being formed, will be wholly or in large part eliminated before the succeeding layer is applied; and any residual or unrelieved effects of such initial strains or subsequent distortions will be so distributed or so interbalanced, as not to affect or detrimentally impair the desired characteristics of the finished shafting;—one of those desired characteristics being an absence of any tendency of the product to twist or kink or curl when it is cut up into short lengths, or otherwise released from end restraint, and to "whip" or "kick" when it is rotated in a bent or curved condition.

Another object of this invention is to provide for a supplemental or complemental treatment of the shaft material while it is being subjected to the fabricating operation, or operations—such additional, or optional, treatment being applied, as desired, either to individual layers, or parts of the uncompleted shafting, or to the complete assembly of the shafting elements; and being either a physico-chemical action, or a mechanical "working" of the strained or distorted fibres—for the purpose of facilitating or aiding, in some cases, the heating operations on the successively assembled portions of the shaft material.

A further purpose of our present improvements is to effect a relief of the initial pressure engagement between each helically wound layer of strand wire and the core or underlying body upon which it is superimposed, by utilizing the differential changes which result from the cooling and contraction of the heated core. This contraction of the core lessens its diameter and also shortens the axial length of the superimposed coil, both factors tending to the relief of the initial pressure engagement. According to our invention we also regulate the amount of these differential changes in accordance with the cross sectional areas of the successively formed portions of the shaft.

Still another object of our invention is the provision of an efficient apparatus, which is capable of concurrently controlling and regulating the various interrelated functional actions that are involved in the practice of our present method of fabricating either uni-layer, or multi-layer, flexible shafting; and which is adapted to provide such shafting in a rapid, efficient, and economical manner.

Other objects and purposes of these improvements, and other advantages attendant upon their use, will be made more apparent by the following description of various alternative means which may be employed in the manufacture of a flexible shaft product in the manner above outlined. In the drawings which accompany this description, and which are considered only as presenting some illustrative embodiments of our invention:

Figs. I and Ia, taken together, present an assembly plan view of one form of apparatus, adapted to carry out our improved process; and Figs. II and IIa taken together, constitute a front elevation of this apparatus;

Fig. III is a view—partly in side elevation and partly in central longitudinal section—of the winding head unit, $A^1$, of Figs. I and II;

Fig. IV is an end elevation—as indicated by the arrows IV—IV of Fig. II—of this unit, and of a part of the driving gear mechanism therefor;

Fig. V is a greatly enlarged longitudinal section of a portion of the construction shown in Fig. III;

Fig. VI is an end view of a part of this construction;

Fig. VII is another detail end view of another part of the general assembly of Fig. III.

Fig. VIII is a longitudinal sectional view of one of the winding head units, $A^3$ and $A^4$, which also form a part of the general assembly depicted in Figs. I$a$—II$a$;

Fig. IX is a greatly enlarged section of one portion of this structure;

Fig. X is an enlarged end view of one of the parts shown in Fig. IX (as indicated by the arrows X—X thereon);

Fig. XI is an end elevation—on the plane XI—XI of Fig. VIII—of the front portion of this head.

Fig. XII is an enlarged side elevation of the draft mechanism $M^4$ shown in Figs. I$a$ and II$a$.

Fig. XIII is a sectioned end elevation of the structural assembly illustrated in Figs. II and II$a$ as viewed in the direction of the arrows XII—XII on these figures;

Fig. XIV is a wiring diagram of the various electric circuits and connections that are shown in part in the general assembly drawings of Figs. II and II$a$;

Figs. XV and XVI are other diagrammatic illustrations of alternative circuits which may be used in place of those shown in Fig. XIV.

Figs. XVII and XVIII are diagrammatic views of a short length of two of the flexible shaft elements, in successive stages of the fabrication process; and, Fig. XIX is an illustrative drawing of a completed four layer shaft.

The general assembly shown in Figs. I and II$a$, inclusive, comprises a core reel C, which is rotatably mounted, at the entrance end of the machine, on a bracket extension, $B^1$ of the main bed frame B; a set of four winding units $A^1$, $A^2$, $A^3$ and $A^4$, which are mounted in tandem on the said frame; a set of four draft units $M^1$, $M^2$, $M^3$, and $M^4$, arranged in corresponding order with respect thereto; a rotary swaging or rolling unit, N, which may be positioned on either side of the terminal draft unit $M^4$; and a take-up spool D, which is preferably supported on an independent floor stand H, at the front or delivery end of the machine. Each associated pair of units, $A^1$—$M^1$, $A^2$—$M^2$, etc. is mounted on its own bed section—these bed sections being rigidly bolted together, end to end, and supported at their extremities by suitable floor pedestals, etc. With this construction any additional number of units may be mounted, in line with the four here shown, by inserting a corresponding number of bed members and floor supports between the two end sections.

A twin jawed electric contact block 1 is mounted at the entry end of the machine on the adjustable pedestal 3; and a similar contact element 2, which is carried by the pedestal 4, is positioned at the discharge end of the apparatus between the last winding head $A^4$ and the capstan draft drum $M^4$. These contacts are connected to the opposite terminals of a suitable source of electric energy, such as the battery V, by the line circuits $v^1$ and $v^5$; and the flow of current through the contact 1 is controlled by the switch and resistance-box elements $r^1$—$R^1$. The line $v^1$ is also connected, by means of the branch circuits, $v^2$, $v^3$ and $v^4$, with the three intermediate draft units $M^1$, $M^2$ and $M^3$;—suitable switch and resistance controls $r^2$—$R^2$, $r^3$—$R^3$ and $r^4$—$R^4$ being also placed in each of these circuits. The pedestal 3, which supports the contact 1, is mounted for longitudinal adjustment on the bed B; and this contact is adapted to slidably engage the core wire at some predetermined point between the core reel C and the winding head $A^1$; and the succeeding circuits $v^2$—$v^3$—$v^4$ and $v^5$ are connected to successively wound shaft portions at points on the exit side of the winding heads $A^1$, $A^2$, $A^3$, and $A^4$. The line terminal $v^1$ is also connected directly with the end draft unit $M^4$; and the flow of current between this unit and the contact 2 is independently regulated by the associated switch and resistance elements $r^5$—$R^5$. The contact elements 1 and 2, and the parts of the successive units $A^1$, $M^1$, $A^2$, $M^2$, $A^3$, $M^3$, $A^4$, $M^4$ and N which are in metallic engagement with the shaft, are, preferably, all insulated from the bed of the machine frame, so as to prevent any irregular or unregulatable flow of current between these parts.

The main bed frame B also carries a motor, F, that is connected by the chain drive G with the jack shaft, J, which extends the entire length of the bed, and which serves to actuate the several trains of driving mechanism for the units $A^1$ to D.

As shown in Figs. I, II and III the heads of the first two winding units $A^1$ and $A^2$ are both designed to receive six strand wire bobbins, 5, 6, 7, 8, 9 and 10; and as shown in Figs. I$a$, II$a$ and VIII the heads of the last two units $A^3$ and $A^4$ are arranged to receive only four such bobbins. But this specific feature of head construction is not essential to the practice of our invention, as each winding unit may be designed to carry as many spools of strand wire as we may desire to use in forming any layer of the fabricated product; it being, of course, always possible to use only a part of the full complement of spools on any one unit.

Each of the rotatable head members of the units $A^1$ or $A^2$ comprises an end disc 11 and an annular ring 12, which are rigidly coupled together by six longitudinal tie bars or rods 13, 13, 13, etc.; and a second disc head 14, which is detachably secured to the annular ring 12 by the terminal nuts 15, 15, 15, etc. on the connecting rods 13, 13, 13, etc. The end discs, 11, and 14, are each provided with trunnion shaft extensions, 16 and 17, which are revolvably mounted in the pedestal bearings 18 and 19. A hollow sleeve 20 is rigidly secured in the hub portion of the end disc 11, and is slidably supported in the opposed hub section of the other end disc 14.

The strand wire bobbins, 5, 6, 7, 8, 9, and 10, are rotatably and slidably supported on the surface of the sleeve, 20; and are held in spaced position between the end disc 11 and a collar 21— that is threaded on the front end of the sleeve 20—by means of the elastic friction washers 22, 22, 22, etc. These washers are capable of free axial movement along the supporting sleeve 20, but are held against rotation thereon by means of keys or pins which slide in a keyway, 23, in the surface of this sleeve; and the pressure engagement between them and the sides of the several bobbins 5 to 10, may be controlled—to vary the tension on the strand wires—by adjusting the position of the collar 21. This may be conveniently done by providing the hub of this collar with worm wheel teeth, which are engaged by a worm, 24, that is carried by a cross shaft 25. The ends of the cross shaft 25 are rotatably mounted in hinged cap boxes 26, 26 (see Fig. VII) that are secured to a pair of diametrically opposite tie bars 13, 13; and one end of this shaft is provided with a star wheel 27 that may be turned by hand, when the winding drum is at rest, or may be operated, when the said drum is revolving, by a pair of reciprocating pins 28, 28, either one of which may be lifted into the path of movement of the star wheel teeth by the manually operable lever 29.

Each of the strand wires is led from the bobbin on which it is spooled, over suitable guide rolls (e. g. the pulleys 30 and 31) to an inclined perforation 32 in the hub of the disc 14; and thence, over a rounded inner shoulder of this hub to, and through, a longitudnal perforation 33 in the front trunnion member 17. The projecting portion of this trunnion is bored out to receive a removable guide nose 34, that is provided in its end surface with a circumferential series of six radially directed guide grooves 35, 35, 35, etc., whose depth is a few thousandths of an inch greater than the normal diameter of the strand wires, and whose outer termini are held in registry with the countersunk ends of the perforations 33, 33, 33, etc., in the trunnion member 17. The grooved surface of this nose is covered by an internally coned sleeve 36 which is slidably mounted in the central bore of the trunnion extension; and which is held in adjustable pressure contact with the front end of the guide nose, 34, by means of the compression springs 37, 37 and the milled head cap 38, that is threaded on the end of the member 17, and is held against accidental displacement by the detent spring 39.

The guide nose 34 is preferably provided with a central bushing 40 of agate, or some other non-conducting and wear resisting material (see Fig. V), that has an axial opening which is only a few thousandths of an inch larger than the core or underlying shaft portion which passes therethrough, and whose forward end coincides, in position and slope, with the bottoms of the guide grooves 35. The forward edges of these grooves are all tangent to the outer periphery of the axial perforation in the bushing 40; and the inclination of their bottom surfaces to the plane of revolution of the winding head is preferably equal to the pitch angle of the helical coils which are to be applied thereby. This pitch angle is determined by the equation—

$$\sin \phi = \frac{n(d+b)}{(c+d)}$$

where $d$ and $c$ are, respectively, the diameters of the strand wires and of the core (or underbody) on which the strand wires are wound; $b$, is the interproximate spacing between successive (adjacent) turns in the wound layer; and, $n$, is the number of strand wires in this layer. Figs. V and VI are illustrative of a construction designed to wind a layer of six strand wire of 0.013" diameter on a core wire of 0.017" diameter with a normal initial spacing of 0.001" between each turn.

The use of the form of guide nose construction which has just been described is very advantageous in that it affords a definite guiding control of each strand wire, up to the point where it is wound upon the core body; and in that it also affords a definite guiding support for the core at the point of strand wire application; and these conjoint actions cooperate to produce a uniformly wound layer of evenly spaced helical coils that may be applied under a minimum of tensional drag and a resultant minimum of initial pressure engagement with the underlying (core) body. In the practice of our process the above described construction also has the advantage of protecting the cold strand wires from being heated, by radiation or conduction from the hot underbody, before they are wound in position thereon; and thus maintaining the maximum difference in temperature between these shaft elements up to the instant of contact.

In order to further protect the core body from irregular cooling, and maintain its desired temperature up to the very point where it receives the cold strand wire, a second guard tube 41 of non-conducting material is concentrically mounted in the revolving winding drum frame, and is detachably clamped in position, in the rear end trunnion 16, by the engagement of the screw cap 42 with the split tapered sleeve 42$^a$. This central tube member 41 is preferably provided with a replaceable lining 43 of a good heat insulating substance, such as bakelite, or fused quartz, which is separated from the outer tube, 41, by a slight air space, and the front end of this lining is extended beyond the adjacent extremity of the surrounding tube, and into the contiguous portion of the guide nose 34, (see Fig. V). The screw cap 42 has an annular extension 44 which rotatably engages a suitable packing sleeve in the adjacent end of an auxiliary guard tube 45, that extends from this sleeve to the first contact block 1, where it is provided with a suitable packing box through which the core wire, $c$, enters the inters the interior of the tube 45. This tube is preferably made up of an outer sleeve of non-conducting material and an inner lining 43$^a$, of the same character as that in the tube 41; and the chamber within this lining is connected with a gas supply conduit 46 by means of a valve controlled pipe 47. The central guard tube (41) of the next winding head (A$^2$)—(which is in all respects similar in construction to that shown in Figs. III to VII inclusive, save that the angle of the winding nose (34) is there designed to apply the strand wires to a larger underbody formed by the first winding head A$^1$)—is similarly connected to another auxiliary tube 45$^a$ that extends to a point near the exit side of the first draft unit M$^1$, and is there connected to the conduit 46 by the valve controlled pipe 47$^a$.

The front pedestal bearing 19 is slidably mounted in a channel shaped guide plate 48 and is detachably clamped in operative position on the bed B by the bolts 50. By loosening these bolts, and removing the nuts 15, 15, 15, etc., the pedestal bearing 19 and the member, 14—17, which is revolvably mounted therein, can be drawn away from the other portions of the winding drum frame; and by backing off the screw cap 42, and thereby allowing the split sleeve 42$^a$ to expand, the projecting front end of the guard tube 41—43 may be pushed back into the surrounding sleeve member 20. The collar 21 and the assembly of bobbin and washer elements (5, 6, 7, 8, 9, 10 and 22) which are held in position thereby, may then be readily removed, from the free end of the sleeve 20, by turning back the caps, 26—26, and taking out the cross shaft 25.

The front pedestal members, 19 and 48,—and the various parts 12, 13, 14, 17, 20, etc., which are in metallic engagement therewith—are insulated from the bed of the machine by the non-conducting plate and bushing elements 49, 49$^a$; and these connected parts are likewise insulated from the rear head and trunnion members, 11, 16, by the non-conducting bushings 51, 52. This arrangement prevents any flow of current from the heated shaft sections through the strand wires that are being wound thereon, and thence to other parts of the apparatus that may be connected to the battery circuits.

The third and fourth winding units $A^3$ and $A^4$ may be of the same general construction as that which has just been described; but, as shown in Figs. II, IIa, VIII, IX, X and XI, we have here chosen to provide an alternative construction which is more particularly adapted to the winding of layers of strand wire on an underbody of some considerable size,—(as compared with the diameter of the central core wire element $c$)—such, for example, as the composite two layer shaft portion which has been formed by the concurrent operation of the units C, $A^1$, $M^1$, $A^2$ and $M^2$. In this alternative construction the rotating winding drum is made up of two end discs $11^a$ and $14^a$, which are rigidly tied together by the rods, $13^a$, $13^a$, $13^a$, $13^a$; and an intermediate four armed spider 53 which is slidably mounted on the said rods, and can be secured thereto at any desired point by the clamping bolts 54. The end disks, $11^a$ and $14^a$ are each provided with a trunnion shaft extension ($16^a$ and $17^a$) which is revolvably mounted in a pedestal bearing, ($18^a$ and $19^a$) which is, in this case, fixedly mounted on its insulating base, $49^a$, on the bed (B) of the machine. A hollow sleeve $20^a$ is detachably secured on, and between the hub portions of the disc $11^a$ and the spider 53; and the strand wire bobbins 5, 6, 7, 8, are, as before, rotatably and slidably supported on the surface of this sleeve, and are held in spaced relation against the end head $11^a$ by the elastic friction washers 22, 22, 22, etc., and the adjustable collar $21^a$. The periphery of this collar is provided with worm wheel teeth which are engaged by a worm $24^a$, that is mounted on a cross shaft $25^a$. The shaft $25^a$ is rotatably mounted in suitable bearings on the arms of the spider 53, and is provided at one end with a star wheel $27^a$ which can be operated, either manually, or automatically by a twin pin contact device $28^a$, $28^a$, $29^a$, similar in all respects to the corresponding arrangement shown in Fig. III. The wire from each bobbin (5, 6, 7, 8) is led over suitable guide pulleys $30^a$, $31^a$ to a winding plate 55, that is removably supported in the front trunnion member $17^a$; and is thence led, through a transverse perforation 56 in the said plate, to the inner end of an adjustable guide and tension sleeve 57, and is there wound around the underlying core body or shafting element $s^2$. As is best shown in the greatly enlarged views of Figs. IX and X, the tension sleeve 57 carries a block 58, of agate or other hard non-conducting die material, which is provided with an axial perforation 59, that is only a little larger than the diameter of the shaft section, $s^3$, there being formed; and whose end face is also provided with four transversely arranged guide grooves, $35^a$, $35^a$, $35^a$, $35^a$, whose width is a few thousandths of an inch wider than the diameter of the strand wires that are being laid on the underlying section $s^2$. The following edges of the grooves $35^a$ are substantially tangent to the periphery of the perforation 59; and at the point where they meet this opening the bottom surfaces of the grooves are inclined to the plane of revolution of the winding head at the angle of "lay"—i. e. the pitch angle of the helical coils in the section $s^3$. The sleeve 57 is held against rotation in the trunnion $17^a$ by a spline and keyway 60; and can be moved axially, toward or from the plate 55, by means of an annular collar, 61, which is threaded on its interior to screw over the outer end of the sleeve 57, and on its exterior to screw into the end of the trunnion extension $17^a$. The inner and outer threads are of different pitch, and by making them nearly alike it becomes possible to adjust the relative positions of the members 55 and 57—58 with great accuracy; and thus vary, with nicety, the amount of bending, and the resultant frictional drag, that is imposed on the strand wires as they are drawn through the perforations 56.

The winding head frame $11^a$—$13^a$—$14^a$—53, etc. is also equipped with a central tube 62, of suitable insulating material, which is engaged, near its entrance end, with a split tapered spring chuck, 63, that is clamped in the recessed end portion of the trunnion $16^a$ by the hollow screw plug 64. This central tube carries a thin metal lining, 65, of relatively high electrical resistance (e. g. nichrome), which projects beyond the entrance end of the tube 62, and is there provided with an enlarged collar 66, that is slidably engaged with the central hub of a collector ring 67. This collector ring is permanently affixed to, but insulated from the plug cap 64, and is engaged by the stationary brush 68, which is carried on insulating supports by a pedestal bracket 69, and is connected to one terminal of an independent electric circuit ($V^6$—$V^6$ or $V^7$—$V^7$) that is supplied with current from a supplemental battery $V^0$. The tubular liner 65 has an internal diameter which is much greater than the external diameter of the shaft section, ($s^2$ or $s^3$), that passes therethrough; but it is provided, at its forward extremity, with a central guide sleeve 70 which is made of some hard non-conducting material, such as agate or fused quartz, and whose central opening is only a few thousandths of an inch larger than this section. The front end of the element 65 is provided with an enlarged conical head, 71, which is engaged by the tapered contact jaws, 72, 72, that are yieldingly mounted in the insulating block, 73, on the hub of the disc $14^a$. The contacts 72, 72 are connected, in the manner shown in Fig. XI, to an insulated collector ring 74, that is secured to the disc $14^a$; and this collector ring is, in turn, engaged by a brush 75, which is mounted on the front pedestal $19^a$, and which is connected to the other terminal of the circuit $V^6$—$V^6$, (or $V^7$—$V^7$). By adjusting the resistance $R^6$ (or $R^7$) in this circuit the volume of current flowing through the lining sleeve 65 may be so adjusted as to raise the temperature in the tubular chamber surrounding the shaft to any desired degree.

The enlarged rear end, 66, of the liner 65 is rotatably engaged with a contiguous thickened portion 76 of another thin liner sleeve 77, (of nichrome or other suitable resistance material) which is carried by the insulating tube 78, that extends rearwardly to a point near the exit pass of the preceding draft unit $M^2$, (or $M^3$), and is there provided with a suitable packing box for the entering shaft section $s^2$, (or $s^3$), and with a valved pipe connection 79, (or $79^a$), to the supply conduit 46. The entrance end of the tube 78 is also provided with a binding post 80, which serves to connect that end of the liner 77 with a parallel branch of the circuit $V^6$ (or $V^7$); and by use of the switch and resistance box elements $r^8$ and $R^8$, (or $r^9$—$R^9$), the flow of current through the liner 77 may be controlled independently of that through the liner 65; so as to maintain either the same or different temperatures in the enclosed chambers of the two guard tubes 62 and 78.

By slightly backing off the screw plug, 64, the split spring chuck 63 is allowed to open and release its grip on the tube 62; and the latter can then be pushed backward, into the larger guard tube 77, without disconnecting any of the parts from the winding head frame. The collar 21$^a$ and the bobbins 5, 6, 7, and 8, can then be readily removed from the sleeve support 20$^a$, by loosening the clamp bolt 54, and sliding the spider head 53— (which, in this case, also carries the worm and worm shaft elements 24$^a$—25$^a$ etc.)—forward on the tie rods 13$^a$. Another set of full bobbins can then be put in place on the head sleeve 20$^a$, and the parts quickly reassembled, ready for a continuation of the operation.

The rotating portions of successive winding units, A$^1$, A$^2$, A$^3$, and A$^4$, are preferably revolved in alternately reversed directions, (i. e. the heads of A$^1$ and A$^3$ in one direction and the heads of A$^2$ and A$^4$ in the other direction), so as to "lay" the strand wires of the progressively superimposed layers, in "crossed" relationship. This rotation is effected—and individually controlled both as to direction and speed—by a train of transmission gearing which comprises, a sprocket wheel, 81, which is driven from the main jack shaft J; a cooperating sprocket wheel 82, detachably secured to one end of a short secondary jack shaft J$^1$; a chain 83 which connects the two sprockets 81, 82; a gear wheel 84 that is removably attached to the other end of the jack shaft J$^1$; a driven pinion 85 which is also detachably secured to the end of the trunnion, 16, (or 16$a$), of the winding drum frame; and a pair of intermediary gears, 86 and 87, both of which are mounted on stud pin blocks that are carried on the adjustable bracket, 88. By changing the size of the sprocket wheel 82, or of either of the gear wheels 84 or 85, (or of any two or all of them), the speed of rotation of the winding head frame may be altered at the will of the operator; and by inserting or removing the intermediary gear 87 (and correspondingly adjusting the connective position of the gear 86) the direction of such rotation may be reversed. The changes just referred to can, of course, only be made when the machine is stopped; but by use of the differential gear mechanism, K, (see Figs. I and I$a$) the rate of revolution of any one of the winding drums (or of all of them) can be individually varied and controlled without interrupting the continuous operation of the apparatus. The particular form of differential gear drive here shown comprises a bevel gear 90 which is secured to the sprocket wheel 81—(which in this case is mounted to revolve freely on the jack shaft J)—a second bevel gear 91 of the same size, which is keyed to the jack shaft; a pair of bevel gears 92, which cooperatively engage the gears 90, 91, but which are themselves mounted to revolve freely on stud pin supports that are carried by a worm wheel 93; and a worm 94 which engages the worm wheel 93, and is secured to the shaft of a reversible variable speed motor L. When the motor is at rest the worm wheel 93 (and the attached supports for the connecting gears 92, 92) is held against rotation by the worm 94; and the sprocket wheel 81 will then revolve at the same speed as, but in the opposite direction from, that of the jack shaft J. But when the motor L is rotated the speed of the sprocket wheel 81—and therefore of the winding frame driven therefrom—is either increased or decreased, (dependent upon the direction of rotation of the motor L), with respect to the jack shaft J; and the rate of revolution of each winding drum can thus be independently altered or adjusted while the fabrication of the shafting is in progress.

Each successively formed composite portion or section of the shaft is engaged by one of the draft units, (M$^1$—M$^2$—M$^3$ or M$^4$), which is positioned just in advance of the corresponding winding unit (A$^1$—A$^2$—A$^3$ or A$^4$) in which that section ($s^1$—$s^2$—$s^3$ or S) is fabricated; and which is designed to apply thereto a controllable axial pull that will establish and maintain a substantially uniform spacing between the successive coils of the helically wound strand wires. The first three of these draft units (viz. M$^1$—M$^2$ and M$^3$) are all of the same construction; and each comprises a pair of capstan drums, or "vise rolls", 95 and 96, that are interposed between the successive winding units A$^1$—A$^2$, A$^2$—A$^3$, A$^3$—A$^4$. The two rolls of each pair are geared together, so as to revolve in opposite directions at the same peripheral speed; and one of them, (preferably the upper roll 95) is secured to a transverse shaft 97 which carries, at its rear end, a worm wheel 98 that is engaged by the worm 99. This worm is secured to the upper end of a short vertical shaft 100 which carries, at its lower extremity, a disc wheel 101 that is held in frictional engagement with a driving roll, 102, by the conjoint action of gravity and of a supplemental pressure spring encircling the shaft 100. The driving roll, 102, is splined to, but is axially adjustable on, the jack shaft J, and may be moved along the latter by means of a shift lever 103 to thereby control the speed or the draft action of the rolls 95 and 96.

The shaft sections which pass through these draft units, M$^1$—M$^2$—and M$^3$, are preferably wound one or more times around each roll, (e. g. in a clockwise direction around the lower rolls 96 and then in a counter-clockwise direction around the upper rolls, 95), and pass from the rolls 95 in the same direction in which they first engage the rolls 96. All of the rolls are insulated from their shaft supports in any suitable manner (e. g by interposing non-conducting bushings between the hub and body portions of the roll); and each of the rolls 95 is provided with a collector ring 105 which is engaged by a contact brush, 106, and is thus connected to one of the branch circuits $v^2$, $v^3$, or $v^4$. Each of the winding units A$^1$—A$^2$ and A$^3$ is also preferably provided with an insulated contact block, 104, which is supported on the front pedestal of the winding head frame by a bracket 107, and which is engaged with the surface of the shaft at a point in close proximity to the end of the collar 38 (or 61). These contacts 104 may be connected with the contacts 106 by low resistance shunts $z^2$—$z^3$—$z^4$ (as indicated by dotted lines in Figs. II—II$a$) for the purpose of short circuiting those sections of the shaft which pass to, and are engaged by, each pair of draft rolls (95—96). This diversion of the current flow at the points 104 and 106 will substantially eliminate any heating of the shafting material between the exit end of each winding head and the delivery side of each draft roll 95; and will permit the portions of this material that have been previously heated, to be quickly cooled to room temperature, by the combined effects of radiation, convection and conductive contact with the relatively massive parts of the rolls 96 and 95. And in order to further expedite this cooling we may, if necessary, provide nozzles, 108, which are mounted on the brackets 107, and are adapted to deliver a stream of cold air, or other suitable coolant, against the shaft as it leaves the contact elements 104. In the semi-diagrammatic illustrations of Figs. I to IIa only one complete contact bracket and nozzle assemblage, (104—107—108), is shown—in conjunction with the winding unit $A^2$—but it will be readily understood that these elements form an optional part of each winding head frame; and that the shunt connections $z^2$—$z^3$ and $z^4$, and the cooling devices 108 are, or are not, used, as conditions may require. It is, however, always desirable to avoid any substantial elevation of temperature in those portions of the shaft which are wound around the draft rolls 96—95, because the heated material is apt to acquire a permanent set when it is bent to a small radius of curvature.

As illustrated in greater detail in Fig. XII, the terminal draft unit, $M^4$, is of somewhat different construction than that used in the three preceding draft units $M^1$, $M^2$, $M^3$. This terminal unit comprises a large capstan drum 110 which is mounted at the upper end of a short vertical shaft 111, that is revolvably supported in the box pedestal bearing 112. This shaft carries a worm wheel 113 which is positioned in the horizontal plane of the jack shaft J and which is engaged by a worm, 114, that is mounted on the cross shaft 115. This latter shaft carries at its outer extremity a disc 116, which is held in elastic pressure engagement with a driving roll 117, that is slidably mounted on the said jack shaft and may be moved axially thereof in any desired manner (e. g. by means of the rocking arm and hand lever elements 118 and 119). This mechanism enables the capstan drum 110 to be frictionally driven at any desired speed, and to exert any desired axial pull on the completed shaft as it is delivered from the last winding head $A^4$. In order to increase the frictional grip of the capstan drum 110 on the shaft, S, the latter is preferably passed two or more times around the periphery of the said drum, and is then led to the take-up spool D through the guide pulleys 120 and 121.

The capstan member 110 is insulated from the head of its shaft support 111, by the non-conducting plate, 122, and the clamp bolt bushings 123, 123 etc.; and is provided with a contact ring 124 that is engaged by a brush 125, by which it is connected to the terminal $v^1$ of the battery. The portion of the complete shaft S which is heated by the flow of current between the contacts 2 and 125 is immediately cooled when it engages the surface of the heavy drum 110, and is thus prevented from acquiring a set when it is bent around this terminal draft member.

The unit N, which is placed on the exit side of the last winding head ($A^4$) is provided for the purpose of supplementing, when desired, the equalizing and stabilizing effects of the heat treatment to which the successively wound wire layers are progressively subjected subsequent to their formation. The supplemental instrumentality which is here diagrammatically indicated comprises a rotary device, which is mounted on the insulated pedestal 126, and is revolved from the axis of the shafting by the pulley and belt connections 127, 128 and 129;—the desired speed of rotation being obtained by varying the size of the pulley 129. This revolving member may be either a rotary swager of the well known Dayton type, or a "rotary compression" of the form shown in Figs. XIV and XV of the Sleeper Patent No. 1,592,909; and both of these devices are so well known to the art as to render a detailed description of them unnecessary.

The unit N may be placed between the last winding head $A^4$ and the terminal draft unit $M^4$, (as shown in full lines in Figs. Ia—IIa); or it may be placed between the units $M^4$ and D (as indicated in dotted lines). When it is placed in the first specified position it may be used, if desired, to connect the branch circuit $v^5$ with the shaft S at the point where the device is operating (see Figs. IIa and XIV); and thus effect a conjoint or simultaneous heating and mechanical working of the outermost layer of wire. A still more pronounced degree of "hot working" can be obtained by interchanging the positions of the unit N and the contact 2, so as to raise the outer layer of the shaft to its maximum temperature, (as determined by the adjustment of the resistance box $R^5$), before it enters the unit N. If this unit is placed on the exit side of the capstan drum 110 (e. g. in its dotted line position) it will produce only a "cold working" of the wound material. We may, if desired, use two of these units, N, one so positioned as to exercise its effect on the heated shafting, and the other so placed as to operate on the product after it has been cooled to room temperature. The selection of any one of the several alternative ways of using these swaging or rolling devices is determined and controlled by the composition and physical characteristics of the material used in the fabrication of the shafting; the tension employed in winding the strand wires; the temperature to which the wound layers are raised; and various other factors which affect the condition of the product as it is delivered from the last winding unit $A^4$.

We have also provided means for driving the shaft, on which the take-up spool D is mounted, from the jack shaft J. As here shown in Figs. Ia and XIII, this driving means may comprise a train of reduction gears 130, 131, 132, and 133, (which are all mounted on a common pedestal bearing 134), and an inclined shaft and a double universal joint connection, 135, which couples the gear 133 with the driven shaft of the take-up spool assembly. This spooling mechanism is of the type ordinarily used in apparatus of this character and does not for that reason require further explanation.

Fig. XIV is a wiring diagram of the various circuits shown in Figs. II and IIa, together with certain additional circuits, for heating the guard tube elements 45—43 of the first two winding units $A^1$ and $A^2$, and other supplementary connections $z^0$—$zr^0$, etc., whose function will be later explained. Fig. XV shows an arrangement of transformer and inductive resistance elements $W^1$—$R^1$, $W^2$—$R^2$, $W^3$—$R^3$, etc., which may be employed to supply alternating currents to the successively formed portions of the shaft which are engaged by the contacts 1, 104, 106, 106, N, 2, (N) and 125;—these reference symbols indicating the same parts of the system as are correspondingly designated in Figs. II, IIa, and XIV. Fig. XV depicts another alternative arrangement for independently controlling the temperature of the various heating and treating chambers of our apparatus. In the arrangement here indicated, all of the winding units, $A^1$, $A^2$, $A^3$ and $A^4$, are provided with electrically heated liners for the guard tubes, 45—43, and 77—62, (similar to those shown in Figs. VIII, IX and XI) which serve to supplement the action of the current flow through the core (c) and the progressively formed shaft sections ($s^1$, $s^2$, $s^3$ and S), both in establishing a uniform predetermined temperature in those sections up to the time of applying the next superimposed winding thereto and also in maintaining the desired thermal conditions in the surrounding gaseous atmospheres. In this case—as in the case of Fig. XV—the reference symbols which have been used, designate parts which are the same, or are equivalent to, the corresponding elements of the earlier described constructions; and, for that reason it seems unnecessary to enter into a more detailed description of the arrangement depicted in Fig. XVI.

The general mode of operation of our improved form of shaft fabricating apparatus is as follows:

The core wire, c, is led from the pay-off reel C, around a movable sheave or drum 140 and thence to a guide pulley 141, which directs it to the first winding unit $A^1$. The drum 140 is rotatably mounted on a vertically swinging arm 142, which is pivotally supported on the end pedestal of the bed B, and is subjected to the downward pull of a long coiled spring 143, whose tension can be adjusted by the threaded rod and hand nut elements 144—145. This spring is attached to the lever 142 at a point slightly above the longitudinal axis of the latter—i. e. to a point about 5° above the line between the pivot support of the arm and the axis of rotation of the drum 140— and under these circumstances the downward pull on the vertically movable members 140—142, (which is due in part to gravity and in part to the elastic force of spring 143) may be made substantially constant over a range of from 30° to 40° angular movement of these members. Any variation in the frictional drag on the core wire, as it leaves the reel C, or any thermal expansion of this wire beyond the contact 1, will be immediately compensated by a corresponding up or down movement of the drum 140; and the first core section of the shaft will be delivered to the first guide nose of the unit $A^1$, under an automatically maintained uniform tension that may be predetermined and preadjusted by the use of the hand wheel 145.

If the changes in the frictional retardation to the feed of the core wire are so large in amount as to move the tension controlling members 140—142—143 beyond the range of action indicated above, accessory mechanism must be provided for taking care of such excessive variations. In the form of construction shown in Figs. I, II this accessory control comprises an electromagnetic brake 146, which rests upon the surface of the wire on the revolving core reel C, and a rolling contact 147 which is mounted on the end of the arm 142, and is engaged with the successive step terminals of a resistance box $R^{14}$ that regulates the flow of current through the exciting coil of the said brake member. When the drag on the core wire is increased the drum 140 is raised, the resistance in the circuit of the brake coil is increased, and the braking action is reduced; and vice versa.

As the uniformly tensioned core wire passes into the guard tubes 45—41 of the first winding head, it is raised to the desired temperature by the current which is passing through the contact 1, and which is so regulated in amount by the resistance $R^1$ that the material of the core body will not be heated to a point at which it is annealed or "equiaxed", i. e., to a point at which it will be softened or will lose its original elastic and stress resisting characteristics.

When the heated core wire reaches the delivery end of the guide nose 34, it receives the first helically wound layer of cold strand wire; and the resultant increase in the cross section of the composite body correspondingly diminishes its electrical resistance, and the attendant heat development by the flow of current therein. In consequence of this the temperature of the material is immediately and materially reduced by the loss of heat to surrounding objects—and this drop in temperature may be further accelerated, if desired, by the use of the shunt connection $z^2$ and (or) the cooling blast nozzle 108—so that the section of shaft which passes to the first draft unit $M^1$, is so cool that it will not be detrimentally affected by its engagement with the rolls 96—95. The draft or axial pull, which is exerted by these rolls on the engaged section of shaft, is determined by the adjustment of the friction roll 102 on the jack shaft J, and by the pressure imposed on the cooperating friction disc 101; and this draft can be so regulated and controlled—in relation to the speed of the winding head, the tension on the strand wires, and the uniform back pull on the core body at the point of winding—as to obtain a uniform interproximate spacing between the successive coils of the helically wound layers. And it is further obvious that the means which we have provided for altering any one or all of the several factors which affect this result—separately or conjointly—enables us to either establish and maintain any desired uniform spacing throughout any extended period of fabrication; or to alter this spacing, whenever desired, without interrupting the operation of the apparatus.

Since each of the sections or portions of the multilayer shaft shown in Fig. XIX, are, or may be, subjected to the same treatment, by substantially the same instrumentalities, it will be unnecessary to further describe the successive steps of our complete fabrication procedure. It is, however, desirable to more fully explain the results that we obtain by the practice of our present improvements; and particularly those which are obtained by the heating of the underlying portions, or core elements of the shaft prior to and during the winding of superimposed layers thereon.

As the successively assembled portions of the continuously fabricated shaft are drawn through the machine, the core wire, C, and each of the sections $s^1$, $s^2$, $s^3$, extending from the exit side of one draft unit, $M^1$, $M^2$ or $M^3$, to the guide nose of the succeeding winding unit, $A^2$, $A^3$ or $A^4$, may be raised to any desired temperature subject to the limitations previously indicated by a conjoint, or cooperative, control of the current flowing therethrough (which may be effected by the resistances, $R^1$, $R^2$, $R^3$ and $R^4$), and by an independent control of the temperatures in each of the surrounding guard tubes, 45—41, 78—62, etc., (which are separately regulated by the adjustment of the resistances, $R^6$, $R^7$, $R^8$ and $R^9$, in the auxiliary battery or transformer circuits $V^oV^o$, etc.,). In the arrangement shown in Figs. II—IIa and XIV, the electric connections to these four sections c, $s^1$, $s^2$ and $s^3$, are all in series with each other; and the current which flows through any one of them, must therefore be equal to the sum of the currents flowing through the preceding sections plus that which is added thereto at the next battery connection (106). But, as already explained, we have provided instrumentalities (e. g. the shunt connections $z^2$—$z^3$—$z^4$, etc.) whereby the portions of the shaft which are engaged by the draft units M¹—M² and M³ may be short circuited, and thus freed from any material heating; and we have further provided additional means for short circuiting the entire length of any or all of the intermediate sections $s^1$—$s^2$ and $s^3$ and thereby preventing any substantial rise of temperature in any of these sections, without in any way interfering with the heating of either the preceding or the succeeding portions of the assembly. This last mentioned means comprises the shunt and switch key elements, $z^o$—$zr^o$, $z^o$—$zr^o$, etc., which connect each of the contacts 104 with the bed B (or with a heavy insulated copper bar mounted thereon); and by closing any two successive switches, $zr^o$—$zr^o$, substantially all of the current which would otherwise traverse the corresponding shaft section will be diverted to the low resistance shunt circuit between its ends, and will have no heating effect on that portion of the shaft assembly.

The heating of the completed shaft S—between the points where it is engaged by the terminal brush, 2, (or the contact in N), and the drum 110—is controlled entirely by the switch and resistance elements $r^5$ and $R^5$; and it is therefore unnecessary to provide any auxiliary shunt or guard tube devices for this section of the product.

The successive heating of each progressively formed portion of the complete shaft,—beginning with the central core wire and ending with the outermost or last applied helical layer—after it is formed, and before any additional portion has been wound thereon, presents important advantages; in that such heat treatment tends to remove or equalize the effects of initial strains and of elastic distortions (due to the winding operations, etc.) in each wire element of the fabricated body, before additional stresses are imposed therein by the application of the next applied layer thereto; in that the total time of heat treatment is proportioned to the severity of the bending stresses to which each helically wound layer of strand wire elements is subjected (being much greater for the innermost than for the outermost layers); in that the temperature to which each layer is raised may be individually regulated, in the successive steps of the winding operations, to correspond either with the severity, or the amount, of the imposed stresses on, or the unrelieved strains in, the frabricated material; and in that the degree or extent of the heating of the successively assembled portions of the shaft may be varied in accordance with differences, if any, in the physical or the chemical character of the wire in the different layers of the finished product.

The above described process of subjecting each portion of the multi-layer shafting to a series of individually controllable and progressively cumulative heat treatments, while the fabrication operations are in progress, also effects a decided economy in the time required, and in the labor necessary, to obtain the finished product; and the shafting thus produced will not, in most cases, require any additional treatment to free it from detrimental elastic inequalities or from irregular or unbalanced stresses and strains, such as would tend to make the shafting "kink" or curl when cut up in short lengths, or to "whip" or "jump" when it is used as a flexible driving member.

It will now be understood that the progressive and cumulative heat treatment of each progressively formed portion of the shaft—as contrasted with the ordinary practice of simultaneously subjecting all of the layers of the completely fabricated shaft to one single and final heat treatment—has a distinct value, in and by itself, and may therefore be advantageously used in conjunction with many forms of apparatus for fabricating flexible shafting—such, for example, as those described in the Angell Patent No. 1,671,951, or in various copending applications Serial Nos. 521,634 and 524,880—which do not embody all of the features of improvement herein disclosed and claimed.

The preliminary heating of each successively assembled shaft section, before the succeeding layer of cold strand wire is wound thereon, presents another feature of advantage, in that it enables us to utilize the subsequent differential contraction, of the hot underbody and of the cooler overlying layer, to effect a relief of the initial pressure contact of engagement between these superimposed elements. It is to be noted in this connection that we have made special provision for protecting and shielding all of the strand wire elements from any rise in temperature up to the point where they are wound on the hot core member; and that each layer of cold strand wire which is last applied is not heated—save by conduction and radiation from the surface of the hot underbody—until it has reached the next contact, (106—95, or 2), in advance of the point of its application; and that, in this interval, the last formed portion of the shafting is cooled to a substantially uniform temperature throughout. In this period of thermal equalization each underlying section of the shaft assumes an external diameter which is less than the internal diameter of the superjacent layer by an amount which is dependent upon, and varies with, the initial differences in temperature between the heated underbody and the cold strand wire coiled thereon, the coefficients of expansion of the materials used, and also with the diameter and pitch angle of each superimposed layer. These relative changes in the diameters of adjacent layers—which results in the desired radial relief of the initial contact engagement therebetween—results from two causes; one being the radial contraction of the underbody, (which amounts in the case of ordinary steel wire to about one fourteenth of one per cent for each 100° F. drop in temperature); and another being the radial expansion of the coils of the overlying layer, which is produced by the linear or axial contraction of this layer. These two effects are diagrammatically illustrated, on an intentionally exaggerated scale, in Figs. XVII and XVIII. The first of these illustrations depicts the relative position of a heated core wire (c) and a layer of cold strand wire (s) wound thereon; and the second figure (Fig. XVIII) depicts the relative positions assumed by these elements (c and s) after they have been contracted, both radially and longitudinally, by cooling to the initial temperature of the cold strand wire. For any given drop of temperature, the radial contraction of the hot underbody is directly proportional to its diameter; and, for a temperature difference of 600° F., is about one two hundred and fiftieth, (four tenths of one per cent), of that diameter. But the enlargement of the overlying coils, s,—due to the axial contraction of the core body, c, and the consequent pulling together of the successive turns of the superimposed layer—is determined not only by the initial diameter of the cold wound helix but also by the pitch angle of that helix—i. e. by the number of strand wires in each layer—and this effect increases quite rapidly as this angle is increased.

The general relation between the several physical factors which determine the relative changes in diameter of the superimposed wire elements is very closely expressed by the equation:

$$x = c\Delta T + \frac{1}{2}(c+d)\tan g^2 \phi \Delta T (2-\Delta T):$$

where $c$ is the diameter of the core body (or underlying layer); $d$ is the diameter of the strand wire wound thereon; $\phi$ is the pitch angle of the wound helix; $\Delta$ is the coefficient of linear expansion of the material per 1°; T is the difference between the temperature of the hot underbody ($c$) and the cold strand wire ($d$) at the instant of winding; and, $x$, is the aggregate difference in the diameters of the core wire and the strand wire layer, that is produced by cooling of the composite shaft section to the original temperature of the strand wire at the time of winding.

As an example of the effects obtainable in the practice of our invention, and as a guide to those skilled in this art, we will consider the case of winding a six strand layer of wire 0.013" in diameter in a core of 0.017" diameter. In this case ($c+d$) is 0.030"; and if the helical turns are wound with a normal interproximate spacing, ($b$) of 0.001", the pitch angle, $\phi$, of each turn is 63°—2'. If T is 600° F. and $\Delta$ is .000007 (ordinary steel wire); then $\Delta$T is, as already stated, approximately 0.004". With these values, we find that $x$ is approximately 0.00053"; or about 3.1% of the core diameter. While this change in the final diameters of the cooled elements $c$ and $s$, is quite small in absolute value it is, nevertheless, quite large enough to effect the necessary radial separation of the superimposed shaft sections ($c$ and $s$), and to obtain the desired relief of the initial pressure engagement, or initial contact pressure, with which these parts are brought into juxtaposition at the time of winding. A less separation—but one sufficient for good results—is obtained by using a temperature difference, (T), of only 400° F.; or by using a finer strand wire ($d$), or a larger core body ($c$); or, more broadly stated, by reducing the pitch angle ($\phi$) of the wound helices. If the material used is phosphor bronze (instead of steel) the effects obtained by a given temperature difference (T), between the hot underbody and the cold strand wire wound thereon, is increased in the ratio between the linear coefficients of expansion of the two materials (about 9 to 6 or 1.5 to 1) and this permits the use of even lower temperature differences, (T), or smaller pitch angles, ($\phi$), than those above considered. We prefer however to use relatively large pitch angles in winding the first two layers—(i. e. to form these layers from a quintuple or sextuple grouping of five or six strand wires)—because this procedure has the incidental advantage of somewhat increasing the radius of curvature, viz. the arc of bending, of the strand wires as they are coiled upon the underbody; and thus reducing, to that extent, the necessary tension of winding, and the initial pressure engagement of the superimposed elements of the resultant shaft section.

By properly controlling the diameters of the wires in the successive shaft sections, and the temperatures to which each section is raised, before the next layer is wound thereon; and by further varying the number of strand wires, and the consequent pitch, of the helical coils in the successively formed layers; and by also varying, if desired, the physical characteristics of the wire in the different shaft elements; we establish any desired relative change in the diameters of the successively superimposed portions of the completed shafting when it is cooled to room temperature; and we thus obtain in one continuous operation, a finished product which is substantially free from any detrimental amount of internal friction; and which can therefore be effectively used in a bent or curved condition as a torque or power transmitting member without undue loss of energy or undue development of heat.

There are some instances in the manufacture of flexible shafting—from certain kinds of material, or for special purposes—when it is advantageous or desirable to supplement the effect of heat treatment, during the fabricating operation, by a mechanical "working" of the outer portion of the product, for the purpose of "setting", and it may be slightly compressing, the fibres and particles of the last wound layer, and thus eliminating or reducing its tendency to uncoil and "open up" when the shafting is cut into short lengths. This mechanical working is effected, when desired, by the use of the rotary swaging or rolling unit N, which is mounted at the delivery end of the machine, and which is so positioned as to operate on the product that is drawn from the last winding head $A^4$, either while it is heated, or after it has become cold. We may, if desired, use two such units, one of the swaging type, and one of the rolling type, which are placed in tandem, one on each side of the terminal draft unit $M^4$, so as to obtain a combined effect of hot rolling and cold swaging, or vice versa;—the apparatus which we have provided for the practice of our process being adapted to allow of these variations of procedure without any material alteration in structure or mode of operation.

The provision of the system of guard tubes, or heating chambers, 41—43; 45—43$^a$; 62—65; 77—78; etc.; which forms a part of our improved apparatus, presents a number of operative advantages: and these parts, or factors of our new combination are adapted to perform various functions, and cooperate in various ways, in the successive heat treatment of the progressively assembled core and strand wire elements of the fabricated shafting. The use of the connected guard tubes, 41—45, 41$^a$—45$^a$, 62—78, etc., not only serves to protect each successively heated portion of the shafting—from the point where the heating current is introduced to the point where the next strand wire layer is applied thereto—from the cooling effect of air currents etc.; but also permits the heated body to be surrounded by an atmosphere of inert gas (e. g. nitrogen or carbonic oxide) which can be supplied to these tubes in any desired regulatable quantities from the pipe and conduit system, 47—47$^a$—79—79$^a$ and 46, (that communicates with any suitable source of supply), and which will prevent oxidation of the heated material. This oxidation is not of any great consequence in the case of steel, if the temperature of heat treatment does not exceed 500° F.; but if the temperature to which the shaft elements are raised is much in excess of this; or if other materials which oxidize readily at low temperatures are used in the fabrication of the product; the protection of the heated shaft elements in the manner just described is important.

The heating of the shaft forming material in closed chambers, and the continuous supply of gases or vapors of various kinds to those chambers—through the conduit and pipe connections 46, 47—47ª, 79—79ª, etc., permits us to obtain, in the case of some materials, another supplemental action, of a physical, or a thermo-chemical, or an electro-chemical nature, which may beneficially alter the surface character of the heat treated material; and thus impart, to the fabricated shafting, characteristics which are not obtained in any other mode of manufacture known to us. These effects are the subject of further investigation and study, and will not for that reason be further described herein; but the mode of procedure, and the apparatus by which they may be obtained, is to be regarded as a part of the present disclosure. And it will be apparent that the combination of instrumentalities which we have here shown and described will permit any one of the treating chambers to be maintained at any desired temperature—(since the guard tubes of the units $A^1$ and $A^2$ may be readily provided with electric heating elements similar to those shown in Figs. IIa and VIII)—and to be supplied with any kind of gas or vapor in any desired volume, or at any desired pressure, through the valve controlled pipes 47—47ª, 79—79ª and the main conduit reservoir 46.

With the preceding disclosure as a guide those skilled in this art will now be able to recognize and understand the characteristic features of our improved process for fabricating flexible shafting in one continuous or uninterrupted operation; and can readily devise various alternative mechanical organizations—(which are the equivalents of the illustrative embodiments hereinbefore described)—for practicing this process. It is obvious, for example, that many different forms of winding mechanism; and various types of draft devices; and various ways and instrumentalities for heating the radially disposed shaft elements; as well as different forms of hot or cold working mechanisms; may be alternatively employed for performing the several steps of our herein disclosed procedure, and for accomplishing the purposes, and obtaining the results that are characteristic thereof.

We are aware that it has been proposed in Letters Patent No. 301,888 to N. W. Hazelton, dated July 15, 1884, to heat to a red heat the individual strand wires of which a cable is being manufactured whereby the contacting surfaces of the wires with the core are flattened. In our process, as herein described, the strand wires are not heated, and the core wire or core body is not raised to such a temperature as would result in an annealing action, or in any softening of the material, that would permit the contacting surfaces to be flattened or distorted by the winding pressure.

Having thus described our invention, we claim:—

1. The process of manufacturing continuous lengths of flexible shafting which consists in heating a central core body and winding thereupon a coil of strand wires at a temperature below the core body and before the core body has cooled.

2. The process of manufacturing continuous lengths of flexible shafting which consists in winding successively superimposed coils of wire, in alternately reversed directions, about a core body, and successively heating each underlying section before and during the winding of the next overlying coil thereon, said overlying coil being wound at a temperature below that of the underlying section.

3. The process of manufacturing continuous lengths of flexible shafting which consists in heating a limited section of each underbody or core, and maintaining the same at elevated temperature at the point of and during the winding thereupon of superimposed layers of stand wire, at normal temperatures.

4. An improvement in the art of fabricating flexible shafting in continuous lengths which comprises the heating of a core body, the winding thereon of an unheated helically coiled layer of strand wire, and the subsequent cooling of the assembled elements to thereby remove the inherent stresses and strains in the heated core body, and also relieve the initial pressure contact between the hot core body and the layer of strand wire wound thereon.

5. An improvement in the art of continuously fabricating flexible shafting having a central core and a series of superimposed helically disposed coils of wire wound thereon in alternately reversed directions, which comprises the heating of the core body and of each of the progressively wound layers applied thereto before and during the winding of another layer thereon, and maintaining a substantial difference in temperature between the underlying body and the last applied layer during each winding operation.

6. An improvement in the art of continuously fabricating flexible shafting having a core and a series of superimposed helically wound coils of wire applied thereto in crossed relationship, which comprises the heating of each progressively formed portion of the shafting in an atmosphere of inert gas before the next applied layer is wound thereon, and then cooling the said portion and the said superimposed layer for the purposes described.

7. An improvement in the art of fabricating flexible shafting in continuous lengths which comprises the heating of each successively assembled portion of the shaft body before and during the winding of the next unheated superimposed portion thereon, and subjecting the outermost or last applied layer of the shaft to a mechanical working whereby the surface fibers of the outermost or last applied layer are set and the said layer is thereby prevented from recoiling or uncoiling when the continuously fabricated shaft is severed into short lengths.

8. An improvement in the art of fabricating flexible shafting in continuous lengths which comprises the heating of each successively assembled portion of the shaft before and during the winding of the succeeding unheated layer thereon, the cooling of the said section and of the said superimposed layer, the reheating of the said cooled portion before and during the winding of the next applied helical layer thereon, and the mechanical working of the outermost layer of the shaft to effect a setting of the surface fibers and to thereby reduce the tendency of the said outermost layer to uncoil when the fabricated shafting is severed into short lengths.

9. An improvement in the art of continuously fabricating flexible shafting having a core and a series of superimposed layers of helically wound wire coiled thereon in successively reversed directions, and which comprises heating the said core and one or more of the said superimposed layers in a gas filled chamber before and during the winding of a succeeding unheated layer thereon, the cooling of the said heated underbody and of the last applied layer, the reheating of the said underbody and layer before and during the application of the next helically wound coil of wire thereon, and the mechanical working of the outermost or last applied layer of the shafting whereby the surface fibers of the said outermost layer are relieved of torsional strain and the tendency of the said outermost layer to uncoil is reduced.

10. An improvement in the art of continuously fabricating flexible shafting having a series of radially superimposed helically wound layers of wire, which comprises the application of heat to each of the said layers before and during the winding of the next unheated layer thereon, the protection of the wires of the last applied layer from the heat applied to the underlayer prior to the winding operation, and the subsequent equalization of temperature in the said underlayer and the overlying layer before the application of the next layer thereto.

11. In an apparatus for the manufacture of flexible shafting in continuous lengths the combination of a payoff reel for delivering a core body to the apparatus, a winding head adapted to apply a plurality of helically wound strand wires to the said core, with means for applying heat to the core body as it is delivered without heating the strand wires which are being applied thereto.

12. In an apparatus for the continuous fabrication of flexible shafting which comprises a composite core and a plurality of helically disposed coils of wire wound thereon, the combination of means for progressing the said composite core through the apparatus, means for heating the said core, means for winding on the said heated core a helically disposed layer of strand wire, means for protecting the said strand wire against the heat of the said core prior to its application thereto, a draft mechanism adapted to impose a predetermined tension on the said core and the said layer of strand wire applied thereto, and means for cooling the said core and the said layer before it is engaged with the said draft mechanism.

13. In an apparatus for the continuous fabrication of flexible shafting the combination of means for delivering a core body to the apparatus, a tension mechanism for imposing on the said core body a constant resistance to the movement thereof, a winding mechanism for applying to the said core body a plurality of helical coils of wire delivered thereto at a predetermined angle, means for heating the said core body to a predetermined temperature prior to the winding thereon of the said helical coils, guard devices for retarding the cooling of the said heated core and for preventing the transfer of heat therefrom to the said strand wires prior to their application to the said core, a draft mechanism for imposing a definite tension on the assembled elements of the shafting, and means for cooling the said assembled elements before they are engaged by the said draft mechanism.

14. In an apparatus for the continuous manufacture of flexible shafting which comprises a core and one or more layers of helically wound strand wires, the combination of a winding mechanism, a payoff mechanism for delivering the core body thereto under a constant predetermined tension, means for applying heat to said core body and maintaining it at a definite temperature during its delivery to the said winding mechanism, a draft mechanism positioned on the delivery side of the said winding mechanism and adapted to impose a definite preadjusted tension on the shaft body formed thereby, and means for cooling the heated core prior to the enngagement of the said shaft body with the said draft mechanism.

15. In an apparatus for the continuous fabrication of flexible shafting the combination of a delivery reel, a plurality of winding units arranged in tandem relationship and adapted to apply a plurality of radially superimposed helically wound layers of wire to a core body as it is drawn from the delivery reel, a plurality of draft mechanisms adapted to impose a predetermined tension on each successively formed portion of a shaft body as it passes from the successive winding units, means for heating each successively formed portion of the said shaft before and during the application of the next helically wound layer thereto, and means for cooling each successively formed portion of the shaft between the point where it leaves each winding head and the point where it is engaged with the next draft mechanism.

16. In an apparatus for the continuous manufacture of flexible shafting of the character described, the combination of a plurality of winding units and a corresponding plurality of draft mechanisms, means for heating the said core body and the successive layers of wire applied thereto by the said units, and means for independently varying and controlling the temperature to which the said core and the successively applied layers of wire are raised prior to and during the winding of the next layer thereon.

17. In an apparatus for the continuous manufacture of flexible shafting of the character described, the combination of a plurality of winding units and a corresponding plurality of draft mechanisms, means for heating the said core body and the successive layers of wire applied thereto by the said units, means for independently varying and controlling the temperature to which the said core and the successively applied layers of wire are raised prior to and during the winding of the next layer thereon, a series of chambers enclosing each successively heated portion of the shaft body, and means for supplying fluid to the said chambers.

18. The process of manufacturing continuous lengths of flexible shafting by winding coil elements around a core which includes as a step creating a difference in temperature between the core and the coil elements at the time of their combination such that when they resume normal temperatures the pressure of the coil on the core due to the winding process is lessened.

ROBERT C. ANGELL.
FRANK L. O. WADSWORTH.